Nov. 5, 1940.        J. A. KASHEW        2,220,485
FRUIT AND VEGETABLE GRATER
Filed Jan. 8, 1940
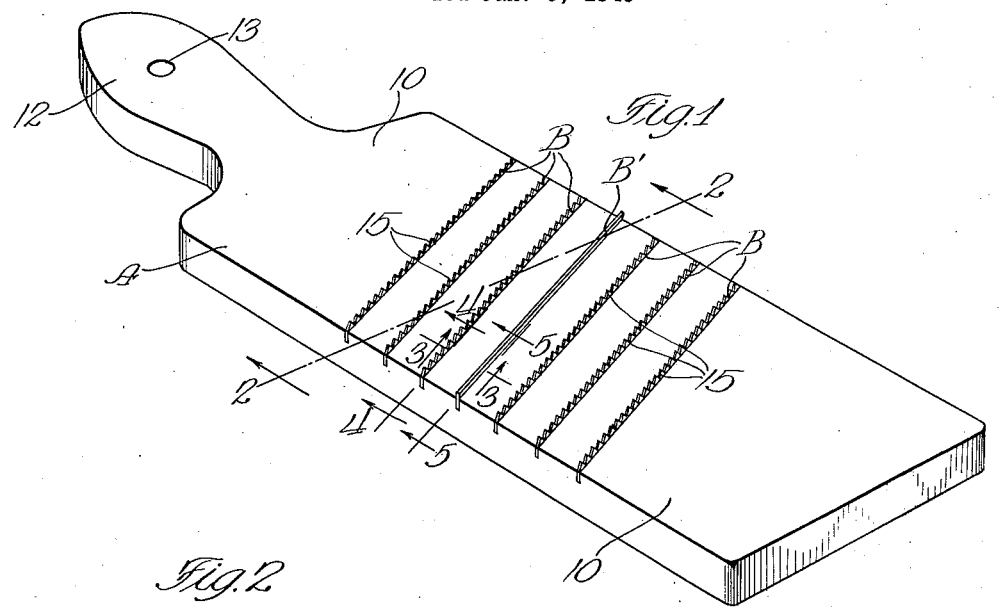
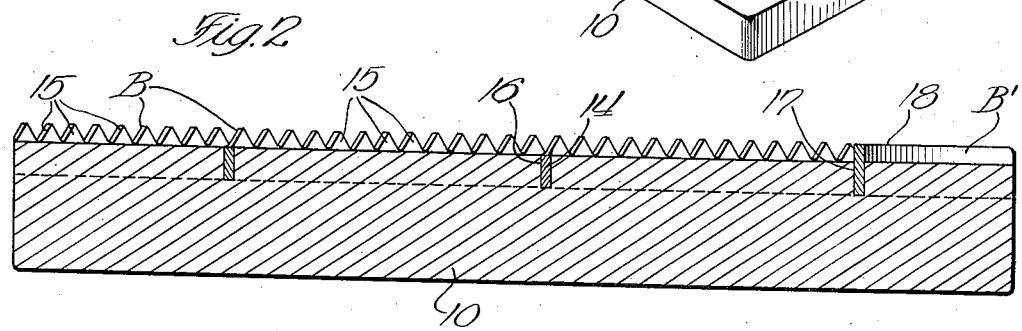
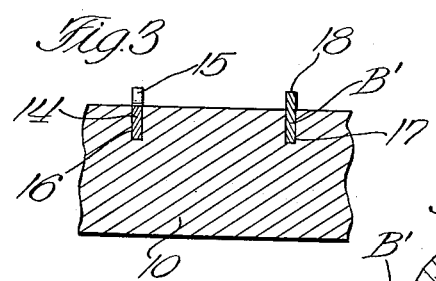
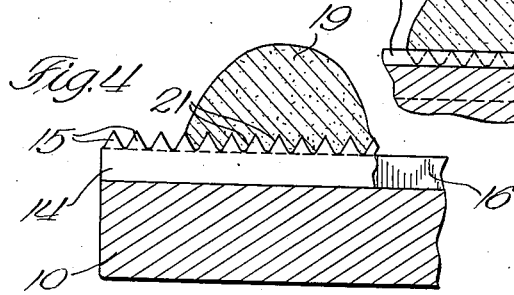
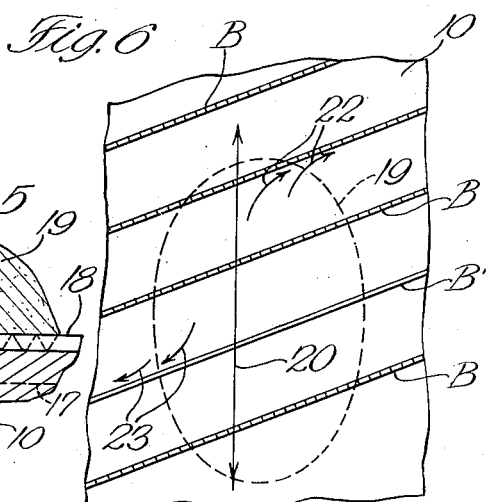
INVENTOR.
John A. Kashew
BY Bair & Freeman
ATTORNEYS Patented Nov. 5, 1940

2,220,485

UNITED STATES PATENT OFFICE 2,220,485

FRUIT AND VEGETABLE GRATER

John A. Kashew, Chicago, Ill.

Application January 8, 1940, Serial No. 312,952

5 Claims. (Cl. 146—177)

My invention relates to a simple and inexpensive grater for fruits and vegetables.

One object of the invention is to provide a grater which may be formed of a base member, such as a board or the like, and a plurality of blades snugly fitted in grooves formed transversely of the base member.

Another object is to provide a grater which can be manufactured with a minimum of expense for material and labor in forming the material and assembling the parts of the grater together.

A further object is to provide a grater so constructed that there are no crevices or slits in which grated material may lodge and from which such material is hard to extract, the grater thereby being easily cleaned and kept in a sanitary condition.

Still a further object is to provide a grater which can be used without the necessity of providing a holder for the vegetable or fruit being grated, the grating blades of the grater being so constructed that they will not harm the hand of the user when accidently coming in contact therewith and yet will effectively grate the material when held against the grater and reciprocated therealong, the arrangement of blades being such that the grated material is efficiently propelled along the blades to fall from the grater without interfering with the grating action.

More particularly, it is an object of my invention to provide a grater which consists of a base member made of a board or the like, provided with transverse grooves arranged at an incline to a line normal to the longitudinal axis of the grater, a combination of serrated and plain blades being provided in the grooves and snugly fitted therein.

With these and other objects in view, my invention consists in the construction, arrangement and combination of the various parts of my device whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which:

Figure 1 is a perspective view of a grater embodying my invention;

Figure 2 is an enlarged sectional view on the line 2—2 of Figure 1;

Figure 3 is an enlarged sectional view on the line 3—3 of Figure 1;

Figure 4 is an enlarged sectional view on the line 4—4 of Figure 1, showing a vegetable being grated;

Figure 5 is a similar sectional view on the line 5—5 of Figure 1 showing a further step in the grating action, and Figure 6 is a plan view of a portion of the grater to show the inclination of the blades with respect to the line of travel of the vegetable.

On the accompanying drawing, I have used the reference character A to indicate generally a base, and the reference characters B and B' to indicate generally grater blades of my grater. The base and blades together form the entire grater.

The base A may be formed of any suitable material, such as a wooden board or a suitable molded composition such as Bakelite or the like. The base A has a substantially rectangular portion 10 and a handle portion 12. A perforation 13 is provided in the handle portion 12 for convenience in hanging the grater on a nail or hook when not in use.

Each blade B consists of a body portion 14 and a series of serrations or teeth 15 cut into the upper edge thereof. The body portion 14 is received in a groove 16 formed transversely of the rectangular portion 10 of the base A and at an angle inclined with respect to a line normal to the longitudinal axis of the base. The blade B' instead of being serrated is plain and is likewise received in a groove 17. The blade B' has a substantially straight upper edge indicated at 18 which, as shown in Figures 2 and 3, is substantially the same distance from the upper face of the base A as the height of the teeth or serrations 15. The serrations 15, it will be noted, terminate at their bases substantially flush with the upper surface of the base A.

The plain blade B' is located between the serrated blades B, as for instance with three serrated blades on each side of the plain blade. This arrangement I have found most effective for accomplishing the grating action and at the same time propelling the grated material off the side edges of the base A. The vegetable or fruit, indicated at 19 in Figure 6, is reciprocated as indicated by the arrow 20, first passing over the serrated blades and then the plain blade. In passing over the serrated blades, the teeth thereof cut grooves 21 in the bottom of the vegetable, as illustrated in Figure 4, and when the ridges between the grooves encounter the plain blade they are planed off by it, as shown in Figure 5. Since the blades B and B' are at an angle relative to the line of reciprocation indicated by the arrow 20, the newly grated material forces that which was grated on the previous stroke outwardly along the blades, as indicated by the arrows 22 in Figure 6, when the vegetable 19 is being moved upwardly, and by the arrows 23 when the vegetable is being moved downwardly. I have found that this action effectively clears the blades of grated material and prevents clogging of the serrations. Also, the fruit or vegetable is grated to a very fine condition in a minimum of time when I provide a base and blade arrangement as contemplated.

Obviously, the number of blades and the arrangement of plain blades with respect to serrated blades may be varied to some extent and secure substantially the same results. The relationship of serrations to the solid and imperforate base A and the height of the plain blade B' as disclosed, however, produce the maximum of efficiency in the grating operation and the grater may be cleaned after use with a minimum of effort. At the same time, the teeth 15 need not be sharpened to a point where they will cut the fingers when coming in contact therewith during the grating operation, and yet effective grating of the fruit or vegetable may be obtained.

While I have shown a particular embodiment of my invention, it will be understood of course that I do not wish to be limited thereto since many modifications may be made, and I therefore contemplate by the claims appended hereto to cover any such modifications or substitutions of mechanical equivalents as fall within the true spirit and scope of my invention without sacrificing any of its advantages.

I claim as new and desire to secure by Letters Patent of the United States:

1. In a fruit and vegetable grater, a base member formed of a board, said base member having grooves in the upper face thereof and extending partially toward the bottom face thereof, a series of laterally arranged grater blades snugly fitted in said grooves and formed of rust resisting material, some of said blades being serrated and at least one of them interposed between the serrated blades having a substantially straight upper face spaced from said base a distance substantially equal to the height of the serrations of said serrated blades, said serrations terminating substantially at the face of said base member, said grooves and thereby said grater blades being inclined with respect to a line normal to the longitudinal axis of said base member and a handle formed at one end of said base member.

2. In a fruit and vegetable grater, an imperforate base member having a series of laterally arranged grooves in the upper face thereof, a grater blade snugly fitted in each of said grooves, some of said blades being serrated and at least one of them being interposed between the serrated blades and having a substantially straight upper face, said grooves and thereby said grater blades being inclined with respect to a line normal to the longitudinal axis of said base member.

3. In a fruit and vegetable grater, a base member having grooves in the upper face thereof, a series of grater blades in said grooves and formed of rust resisting metal, one of said blades having a substantially straight upper face and being located with the serrated blades on either side thereof, said grater blades being inclined with respect to a line normal to the longitudinal axis of said base member and a handle formed at one end of said base member.

4. In a fruit and vegetable grater, an imperforate base member, said base member having grooves in the upper face thereof which are inclined with respect to a line normal to the longitudinal axis of said base member, a grater blade fitted in each of said grooves, some of said blades being serrated with the serrations thereof terminating substantially at the face of said base member, and at least one of said blades between the serrated blades being provided with a substantially straight upper face spaced from said base a distance substantially equal to the height of the serrations of said serrated blades.

5. In a fruit and vegetable grater, a base member, said base member having a series of grooves in the upper face thereof which are lateral of said base member and at an incline relative to its lateral axis, grater blades in said grooves, said blades being serrated and one of them having a substantially straight upper face, and a handle formed at one end of said base member.

JOHN A. KASHEW.